United States Patent Office 3,014,048
Patented Dec. 19, 1961

3,014,048
POLYESTERS OF 3-OXATRICYCLO[3.2.1.0$^{2,4}$]
OCTANE-6-METHANOLS
Samuel W. Tinsley, South Charleston, and Paul S. Starcher, Charleston, W. Va., assignors to Union Carbide Corporation, a corporation of New York
No Drawing. Filed Apr. 16, 1959, Ser. No. 806,754
6 Claims. (Cl. 260—348)

This invention relates in general to a new class or organic compounds and more particularly to polyesters of 3-oxatricyclo[3.2.1.0$^{2,4}$]octane-6-methanols and methods for their preparation.

The polyesters of 3-oxatricyclo[3.2.1.0$^{2,4}$]octane-6-methanols, hereinafter also referred to as epoxyesters, can be conveniently represented by the following general formula:

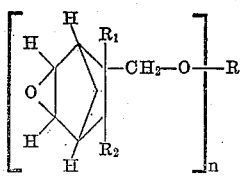

wherein $R_1$ and $R_2$ are members selected from the group consisting of hydrogen and alkyl radicals, R represents the residue of the radical derived from the polycarboxylic acid used in the esterification reaction, and $n$ is a whole positive integer of from 2 to 12. Preferred compounds are those wherein $R_1$ and $R_2$ contain from 0 to 18 carbon atoms, R contains from 2 to 18 carbon atoms and $n$ has a value of from 2 to 8. Also preferred are those compounds wherein $R_1$ and $R_2$ contain from 0 to 6 carbon atoms and R contains from 2 to 18 carbon atoms and includes aliphatic, cycloaliphatic and aromatic compounds possessing more than one acyl group. Particularly preferred are compounds wherein R contains at least one epoxy group and includes epoxyaliphatic acyl, epoxycycloaliphatic acyl, and epoxybicycloaliphatic acyl groups.

Due to the presence of the epoxy group,

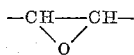

the novel compounds of this invention possess useful solvent properties. For example, they are compatible with many vinyl chloride and vinylidine chloride resins. Accordingly, many of the higher esters can be used as plasticizers for these and other resins. For example, the novel compounds of this invention containing two epoxy groups have been found useful as plasticizers with vinyl halide resins. By incorporating into the resin from about 5 to about 50 percent by weight of these novel diepoxides, a plasticized product is obtained which possesses useful resilient and flexible characteristics. The vinyl halide resins which can be satisfactorily plasticized by the compounds of this invention can be any vinyl halide polymer such as poly(vinyl chloride), vinyl chloridevinyl acetate copolymer, vinyl chloride-acrylonitrile copolymers, vinyl chloride-vinylidene chloride copolymers, vinyl chloride-vinylidene chloride-acrylonitrile copolymers and the like. The compounds of this invention may be used alone or in conjunction with conventional plasticizers. In addition to their use as plasticizers, the compounds of this invention can be employed as stabilizers for chlorine-containing resins where they are effective even at low concentrations. These compounds are also useful in the preparation of synthetic lubricants, tanning agents and biological preparations.

Furthermore, the compounds of this invention are useful as intermediates in the preparation of a large number of new chemical compounds by virtue of the epoxy group which is capable of reacting with compounds possessing one or more hydrogen atoms such as phenols, alcohols, carboxylic acids, amides, amines, mercaptans and the like. These epoxides can also be polymerized, especially by Lewis acids, to form polymers useful for coatings and the like.

A particularly interesting class of compounds included within the scope of the present invention embraces epoxyester compounds which contain a reactive double bond in the acid moiety of the molecule as well as the epoxy groups in the alcohol moiety. These compounds are especially useful and differ from compounds lacking unsaturation in that they can be converted to polymers through either the oxirane rings or the polymerizable double bond and thereafter cross-linked through whichever of these two was not used in the initial polymerization. Thus the epoxyesters of this invention which contain a double bond in a terminal position of the acid moiety are particularly useful since they can be incorporated into polymers through the polymerizable linkage and the epoxy group subsequently used for cross-linking the resin.

It is accordingly an object of the present invention to provide new organic compounds which are suitable for use in the plastics and resin fields. Another object is to provide new compositions of matter comprising polyesters of 3-oxatricyclo[3.2.1.0$^{2,4}$]octane-6-methanol and alkyl substituted 3-oxatricyclo[3.2.1.0$^{2,4}$]octane-6-methanols. Another object of the instant invention is to provide new compositions of matter comprising unsaturated polyesters of 3-oxatricyclo[3.2.1.0$^{2,4}$]octane-6-methanol and their alkyl substituted derivatives. A further object of the present invention is to provide new compositions of matter comprising polyesters of 3-oxatricyclo[3.2.1.0$^{2,4}$]octane-6-methanols containing at least one epoxy group in the acid moiety of the polyester. A still further object is to provide new compositions of matter comprising polyesters having at least one unesterified carboxy group. A still further object of the present invention is to provide novel polymers and copolymers containing epoxy groups. Another object is to provide new polymers which can be cross-linked through said epoxy groups. A further object is to provide processes for the preparation of the novel compositions of matter of this invention. These and other objects will readily become apparent to those skilled in the art in the light of the teachings herein set forth.

The epoxyesters of this invention are preferably named 3-oxatricyclo[3.2.1.0$^{2,4}$]octane-6-methyl carboxylates in accordance with the system of nomenclature adopted by the American Chemical Society for use in Chemical Abstracts.

In accordance with the process of this invention, the novel compounds are produced in relatively high yields by the epoxidation of the olefinic linkages contained in the bicyclo[2.2.1]-5-heptene ring of the polyester starting material.

In the polyesters prepared from saturated acids, the only double bonds present are in the bicyclo[2.2.1]-5-heptene rings, and the epoxidation is effected quite easily. In the polyester prepared from unsaturated acids more than one site of unsaturation is present in addition to that in the ring which can be epoxidized. In many of these compounds it has been observed that epoxidation can occur selectively. Thus, for α,β-unsaturated esters the rate of epoxidation is so low that very little reaction occurs at the double bond of the α,β-unsaturated ester group while for other double bonds the rate may be quite high. Thus, by appropriate combinations of different olefinic groups an essentially complete selectivity can be achieved in the preparation of many epoxy unsaturated esters. Compounds which contain double bonds of approximately the same reactivity toward epoxidation can usually not be selectively epoxidized unless the epoxidizing agent is reacted with a large excess of diolefin.

The polyesters of bicyclo[2.2.1]-5-heptene-2-methanol which are used as the starting materials for the present invention may be prepared by reacting cyclopentadiene with an allylic alcohol by the conventional Diels-Alder condensation wherein $R_1$ and $R_2$ are as indicated above:

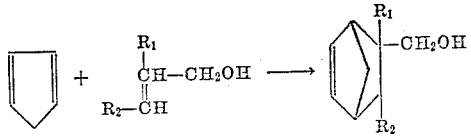

Thereafter the alcohol can be reacted with carboxylic acids to produce the corresponding polyester. Other methods are also available for preparing the alcohol such as the Diels-Alder condensation of cyclopentadiene and an alpha, beta-unsaturated aldehyde. Thus as illustrative of one method of preparation of the starting materials of this invention cyclopentadiene can be reacted with acrolein, methacrolein, crotonaldehyde and the like to give a condensation product which can be reduced respectively to bicyclo[2.2.1]-5-heptene-2-methanol, 2-methyl bicyclo[2.2.1]-5-heptene-2-methanol, and 3-methyl bicyclo[2.2.1]-5-heptene-2-methanol. The alcohol is thereafter esterified with a polycarboxylic acid to form the unepoxidized starting material.

The acids suitable for use in preparing the esters of the unsaturated cycloaliphatic alcohols prior to the epoxidation reaction may be any suitable saturated or unsaturated aliphatic, cycloaliphatic, aromatic or epoxy polycarboxylic acid. The following list of acids illustrates the variety of compounds which may be employed to prepare the polyesters of the bicyclo[2.2.1]-5-heptene-2-methanols:

DICARBOXYLIC ACIDS

Oxalic acid
Succinic acid
Pimelic acid
Sebacic acid
Maleic acid
Blutaconic acid
Phthalic acid
Terephthalic acid
2-allyl succinic acid
Cyclohexene dicarboxylic acid
5-decene-1,1-dioic acid
1,3-butadiene 2,3-dicarboxylic acid
2-(2,3-epoxypropyl)succinic acid
5,6-epoxydecene-1,10-dioic acid
Bicyclo[2.2.1]-5-heptene 2,3-dicarboxylic acid
3-oxatricyclo[3.2.1.0$^{2,4}$]octane 6,7-dicarboxylic acid
Tetraethylene glycol bis(hydrogen phthalate)

POLYCARBOXYLIC ACIDS 1,2,4-hexanetricarboxylic acid
3-hexene-2,2,5,5-tetracarboxylic acid
1,3,5-benzenetricarboxylic acid
1,2,4,5-benzenetetracarboxylic acid The mixed esters of polycarboxylic acids are also included within the scope of this invention as long as at least two of the carboxylic acid groups are esterified with the above alcohol. Also included are the esters of unsaturated polycarboxylic acids, polyether carboxylic acids, arylalkyl carboxylic acids, cycloalkyl carboxylic acids, epoxy acids and the like.

As previously indicated, the compounds of this invention are produced by the oxidation of the olefinic linkage contained in the corresponding polyester of bicyclo[2.2.1]-5-heptene-2-methanol. Peracetic acid is particularly well suited for the oxidation of the olefinic linkage or epoxidation reaction since this epoxidation reaction can be carried out under relatively mild conditions and with a minimum of operating difficulty.

In one embodiment of the present invention, the epoxidation of the unsaturated starting materials is carried out at temperatures in the range of from −25° C. to 150° C. At the lower temperatures, the rate of epoxidation is slow while at the higher temperatures the rate is faster necessitating precautions to prevent further reaction of the epoxide groups. In order to avoid undesired side reactions and to provide a suitable reaction rate, temperatures in the range of from 10° C. to 90° C. are preferable. In the practice of the invention, the unsaturated starting material is conveniently charged to a reaction vessel and the appropriate quantity of peracetic acid is added. Two or more moles of peracetic acid per mole of unsaturated ester are usually added to the starting material, and will vary depending on the amount of unsaturation in the aliphatic portion of the molecule. The mole ratio is not necessarily critical and can be varied over a wide range depending on whether the mono-, di-, or higher epoxy compound is desired. The reaction is allowed to proceed for a time sufficient to consume approximately the theoretical quantity of peracetic acid needed to effect epoxidation. The amount of peracetic acid consumed can be determined by periodic tests for peracetic acid. Usually from about one to about ten hours is sufficient for the reaction to be completed at the preferred temperature. It is preferred, although not absolutely necessary, to separate the by-product acetic acid from the epoxide rapidly, since the acetic acid will react with the epoxide to form undesired products, decreasing the overall yield. Finally, the reaction mixture is subjected to conventional recovery procedures to isolate the epoxyester. Extraction with a suitable solvent, continuous distillation, or distillation under reduced pressures all are applicable to the recovery of the epoxide product.

Other peroxides such as perbenzoic acid, monoperphthalic acid, performic acid and hydroperoxides may be used as the epoxidizing agent, but for economic reasons, peracetic acid is more desirable for commercial application.

Copolymers of the polyesters of 3-oxatricyclo[3.2.1.0$^{2,4}$]octane-6-methanols, containing polymerizable unsaturation in the acid moiety of the ester, can be prepared with a polymerizable ethylenically unsaturated compound. Examples of such compounds are vinyl and vinylidene halides such as vinyl chloride; acrylic acids, esters, nitriles and amides such as acrylic acid, methacrylic acid, methyl methacrylate; vinyl carboxylates such as vinyl acetate, vinyl butyrate and the like. The polymerization conditions are not critical and in general from about 0.01 to about 5 percent of a free radical producing initiator by weight of the total polymerizable components will give satisfactory results. The particular application of the resulting copolymer will be determinative of the relative proportions of the monomers used. The resulting thermoplastic resin can then be cross-linked through the epoxy group. Cross-linking can be effected by dissolving the copolymerized resin in a suitable solvent such as toluene and methyl isobutyl ketone, adding thereto from about 0.1 to about 3 percent of phosphoric acid or diethylenetriamine by weight of solution, and heating the mixture.

Compounds of the instant invention can also be homopolymerized through the polymerizable unsaturation contained in the acid moiety of the polyester and the resulting polymer also cross-linked through the epoxy group. For the polyesters with no polymerizable unsaturation, the esters can be homopolymerized directly through the epoxy group itself, for example, by heating in the presence of a boron trifluoride-monoethylamine complex to give a viscous polymer.

The following examples illustrate the best mode presently contemplated for the preparation of the compounds of this invention.

Example I.—Preparation of ethyl bis(bicyclo[2.2.1]-5-heptene-2-methyl) 1,2,4-butanetricarboxylate A mixture of 272 grams of triethyl 1,2,4-butanetricarboxylate, 306 grams of bicyclo[2.2.1]-5-heptene-2-methanol, 170 grams of toluene, and 1 gram of octyleneglycol titanate was heated under reflux (150°–170° C.) and the toluene-ethanol azeotrope was removed as it was formed. After 4 hours, the theoretical amount of ethanol had been removed. The reaction mixture was washed with water and pot stripped to a kettle temperature of 176° C. at a pressure of 2 millimeters of mercury. The residue product, which was predominantly a mixture of ethyl bis(bicyclo[2.2.1]-5-heptene-2-methyl) and tris(bicyclo[2.2.1]-5-heptene-2-methyl) 1,2,4 - butanetricarboxylates was obtained as a straw-colored slightly viscous liquid having a saponification equivalent of 169 and a refractive index of 1.4997 ($n$ 30/D). The infrared spectrum was consistent with the assigned structure.

Example II.—Preparation of ethyl bis(3-oxatricyclo[3.2.1.0$^{2,4}$]-octane-6-methyl) 1,2,4-butanetricarboxylate To 273 grams of ethyl bis(bicyclo[2.2.1]-5-heptene-2-methyl) 1,2,4-butanetricarboxylate was added dropwise over a period of 2.5 hours, 547 grams of a 29.1 percent solution of peracetic acid in ethyl acetate at a temperature of 40° C. After an additional reaction period of 4 hours, approximately the theoretical amount of peracetic acid had been consumed. The volatiles were removed by co-distillation with ethylbenzene and the product was pot stripped to a kettle temperature of 75° C. at a pressure of 1 millimeter of mercury in a slow stream of nitrogen. The resulting residue product was a pale almost colorless viscous liquid having a saponification equivalent of 203. The infrared spectrum was consistent with the assigned structure. The product was approximately a 50–50 mixture of the tris(3-oxatricyclo[3.2.1.0$^{2,4}$]octane-6-methyl) and the ethyl bis(3-oxatricyclo[3.2.1.0$^{2,4}$]octane-6-methyl) 1,2,4-butanetricarboxylates.

Example III.—Preparation of bis(bicyclo[2.2.1]-5-heptene-2-methyl) maleate

A mixture of 147 grams of maleic anhydride, 434 grams of bicyclo[2.2.1]-5-heptene-2-methanol, 250 grams of toluene, and 2 grams of p-toluenesulfonic acid was heated under reflux on a still equipped with a water decanter. During 14 hours at a kettle temperature of 150°–170° C. there was removed a total of 27 grams of water layer. The reaction mixture was then washed twice with a sodium carbonate solution and once with water and pot stripped to a kettle temperature of 160° C. at a pressure of 10 millimeters of mercury. After treating with activated charcoal and filtering, the residue product, bis-(bicyclo[2.2.1]-5-heptene-2-methyl) maleate, was obtained as a pale yellow slightly viscous liquid having a refractive index of 1.5162 ($n$ 30/D), a purity by saponification of 96 percent and no free acidity. The infrared spectrum was consistent with the structure. Analysis: Calc'd. for $C_{20}H_{24}O_4$; C, 73.14; H, 7.36. Found: C, 72.7; H, 7.41.

Example IV.—Preparation of bis(3-oxtaricyclo[3.2.1.0$^{2,4}$]octane-6-methyl)-maleate To 218 grams of bis(bicyclo[2.2.1]-5-heptene-2-methyl) maleate was added dropwise 451 grams of a 29.1 percent solution of peracetic acid in ethyl acetate over a 1.5-hour period at a temperature of 40° C. After an additional 5-hour reaction period at 40° C., the consumption of peracetic acid had leveled out at 87 percent of the theoretical. The volatiles were removed by co-distillation with ethyl-benzene and the product was pot stripped to a temperature of 75° C. at a pressure of 1 millimeter of mercury in a slow stream of nitrogen. The residue product, bis(3-oxatricyclo[3.2.1.0$^{2,4}$]octane - 6-methyl) maleate, was a pale yellow viscous liquid having a purity of 96 percent as determined by saponification. The infrared spectrum was consistent with the assigned structure.

The foregoing detailed description has been given for clearness of understanding of the present invention and no unnecessary limitations are to be understood therefrom except as such limitations appear in the claims.

What is claimed is:

1. A polyester of the formula:

$$\left[ \begin{array}{c} \text{(structure with H, R}_1\text{, R}_2\text{, O, and } -CH_2-O- \text{)} \end{array} \right]_n -R$$

wherein R is the polycarboxylic acid moiety of said ester and has from 2 to 18 carbon atoms; $R_1$ and $R_2$ are members selected from the group consisting of hydrogen and alkyl up to 18 carbon atoms; and $n$ is a whole positive integer of from 2 to 8.

2. The polyester of 3-oxatricyclo[3.2.1.0$^{2,4}$]octane-6-methanol and an unsubstituted, saturated aliphatic polycarboxylic acid of from 2 to 18 carbon atoms and from 2 to 8 carboxy groups.

3. The polyester of 3-oxatricyclo[3.2.1.0$^{2,4}$]octane-6-methanol and an unsubstituted olefinically unsaturated, aliphatic polycarboxylic acid of from 2 to 18 carbon atoms and from 2 to 8 carboxy groups.

4. The polyester of 3-oxatricyclo[3.2.1.0$^{2,4}$]octane-6-methanol and an unsubstituted carbocylic aryl polycarboxylic acid containing up to 18 carbon atoms and up to 8 carboxy groups.

5. Ethyl bis(3-oxatricyclo[3.2.1.0$^{2,4}$]octane-6-methyl) 1,2,4-butanetricarboxylate.

6. Bis(3-oxatricyclo[3.2.1.0$^{2,4}$]octane-6 - methyl) maleate.

References Cited in the file of this patent

Arbuzov et al.: J. Applied Chem., USSR, pp. 57–59 (1956).